United States Patent

Mihara

[11] Patent Number: 6,163,573
[45] Date of Patent: Dec. 19, 2000

[54] EQUIPMENT AND METHOD FOR COMPRESSING PICTURE DATA

[75] Inventor: Kanji Mihara, Kanagawa, Japan

[73] Assignee: Sony Corporation, Tokyo, Japan

[21] Appl. No.: 09/117,973

[22] PCT Filed: Dec. 11, 1997

[86] PCT No.: PCT/JP97/04565

§ 371 Date: Nov. 24, 1998

§ 102(e) Date: Nov. 24, 1998

[87] PCT Pub. No.: WO98/26602

PCT Pub. Date: Jun. 18, 1998

[30] Foreign Application Priority Data

Dec. 12, 1996 [JP] Japan .................................. 8-332080
Dec. 12, 1996 [JP] Japan .................................. 8-332081

[51] Int. Cl.[7] .................................................. H04N 7/12
[52] U.S. Cl. ........................... 375/240.02; 375/240.03
[58] Field of Search .......................... 375/240.02, 240.03, 375/240.06, 240.13; 348/402.1, 404.1, 406.1; 382/236, 238, 251

[56] References Cited

U.S. PATENT DOCUMENTS

| | | | |
|---|---|---|---|
| 5,150,432 | 9/1992 | Ueno et al. ............................. | 382/250 |
| 5,228,028 | 7/1993 | Cucchi et al. ......................... | 370/392 |
| 5,369,437 | 11/1994 | Koga et al. ............................ | 348/401 |
| 5,412,431 | 5/1995 | Vogel .................................... | 348/405 |
| 5,526,052 | 6/1996 | Ar .......................................... | 348/405 |
| 5,786,859 | 7/1998 | Ueno et al. ............................ | 348/416 |
| 5,831,688 | 11/1998 | Yamada et al. ........................ | 348/699 |
| 5,832,121 | 11/1998 | Ando ..................................... | 382/236 |
| 5,841,942 | 11/1998 | Sugiyama .............................. | 386/109 |
| 5,867,625 | 2/1999 | McLaren ............................... | 386/68 |
| 5,940,130 | 8/1999 | Nilsson et al. ........................ | 348/416 |
| 6,023,553 | 2/2000 | Boyce et al. .......................... | 386/109 |

FOREIGN PATENT DOCUMENTS

| | | | |
|---|---|---|---|
| 0710030 A1 | 5/1996 | European Pat. Off. ......... | H04N 7/26 |
| 6-319112 | 11/1994 | Japan .............................. | H04N 7/12 |
| 7-111592 | 4/1995 | Japan .............................. | H04N 7/12 |
| 8-130743 | 5/1996 | Japan .............................. | H04N 7/12 |

*Primary Examiner*—Vu Le
*Attorney, Agent, or Firm*—Frommer Lawrence & Haug, LLP.; William S. Frommer

[57] ABSTRACT

When repeatedly performing compression and encoding of video data, automatically detecting a previous picture type at an encoder side and performing the compression and encoding by matching GOP phases.

A motion compensation unit 240 to a DCT unit 244 perform motion compensation, DCT, etc. on input video data to generate DCT coefficients. A back search unit 248 detects whether or not there is a relative minimum in the sum of remainders of the results of division by the quantization steps of the DCT coefficients, judges that the picture having the relative minimum has been compressed and encoded to an intra-picture in the previous compression and encoding, and judges the structure of the GOPs (a number N of pictures and an interval M of P pictures) at the previous compression and encoding. A picture type control unit 250 controls a picture rearrangement unit 200 based on the judged GOP structure to make it rearrange pictures of the input video data to an order by which a compression and encoding unit 20 can perform compression and encoding with the same GOP phase as that of the previous time.

20 Claims, 7 Drawing Sheets

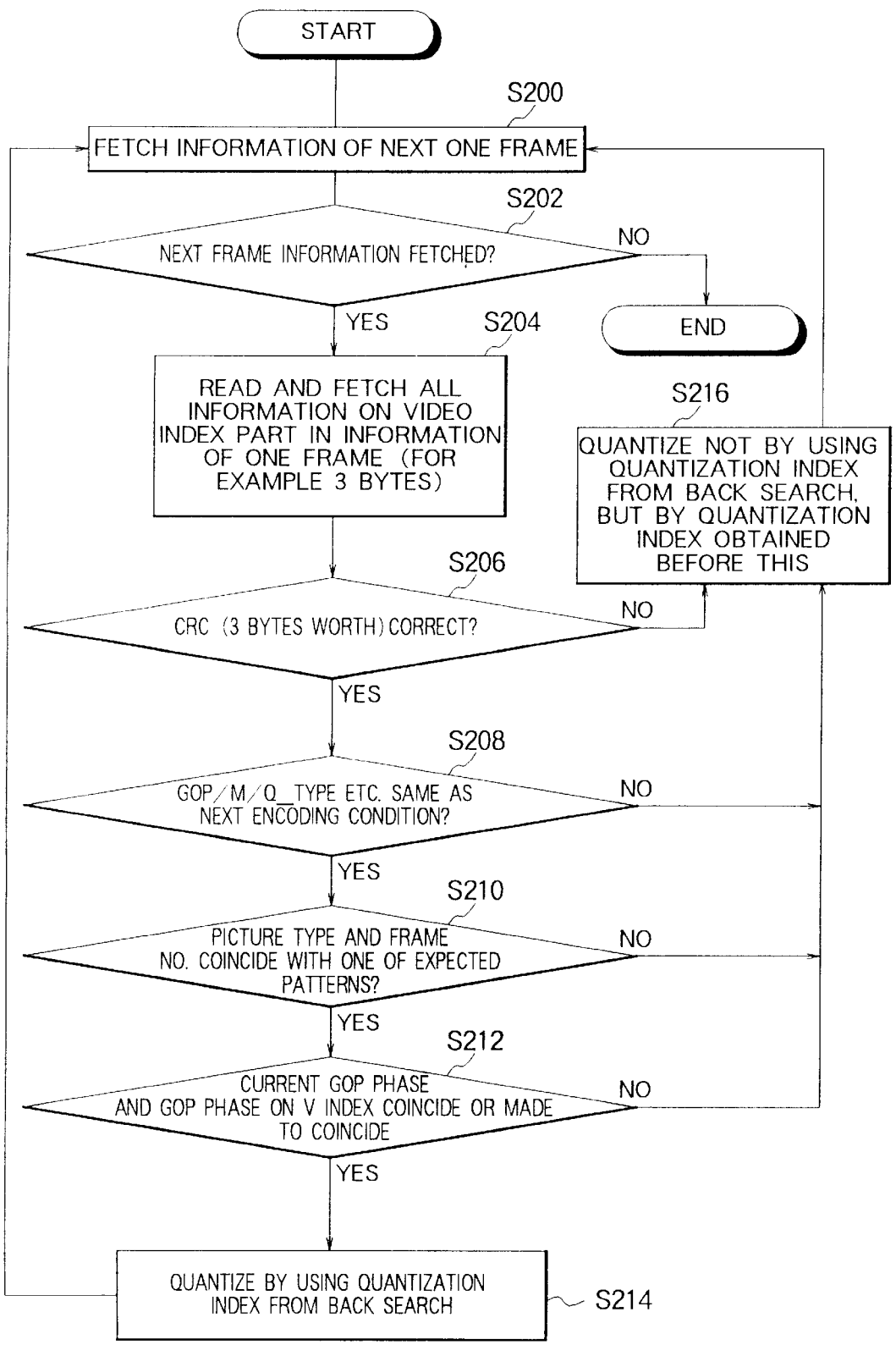

EQUIPMENT AND METHOD FOR COMPRESSING PICTURE DATA

TECHNICAL FIELD

The present invention relates to a video data compression apparatus, and a method of the same, for compressing and encoding pictures of expanded and decoded video data to pictures of the same type as that at the previous compression and encoding when for example dubbing video data by connecting in tandem video tape recorders (VTRs) which record video data compressed and encoded by an MPEG method or the like and expand and decode the reproduced video data for output.

BACKGROUND ART

In recent years, in the field of video data compression, frequent use has been made of the MPEG2 (Moving Picture Experts Group 2) method as a so-called MC-DCT method of improving an encoding efficiency by a combination of motion compensation (MC) processing and redundancy reduction processing by discrete cosine transfer (DCT) and other orthogonal transformation.

In this MPEG2 method, usually non-compressed video data is compressed and encoded in units of "groups of pictures" (GOPs) each containing one intra-picture capable of being expanded and decoded without use of the pixel data of other pictures and predetermined numbers of predictive pictures (P pictures) to be expanded and decoded by using the pixel data of the previous picture and bidirectionally predictive pictures (B pictures) to be expanded and decoded by using the pixel data of the previous and following pictures.

Here, for example, when transmitting video data between television broadcasting stations or dubbing video data by using a plurality of video tape recorders (VTRs), in order to expand and decode the video data which has been already compressed and encoded by the MPEG2 method and then compress and encode the same again, it is necessary to connecting a compression and encoding apparatus (encoder) and an expansion and decoding apparatus (decoder) in series (tandem connection).

When repeating this compression and encoding and this expansion and decoding of the video data in this way by repeatedly connecting in tandem the encoder and the decoder, the quality of the video deteriorates. Particularly, television broadcasting station facilities and other industrial use systems require a high video quality, so prevention of deterioration of the video quality along with the compression and encoding and the expansion and decoding by a tandem-connected encoder and decoder is strictly required.

In order to minimize the deterioration of the video quality occurring in the tandem-connected encoder and decoder, it is necessary to make the quantization steps used in the compression and encoding and the expansion and decoding the same. The quantization steps must also be held together with the compressed video data.

When performing compression and encoding without performing motion compensation processing, as disclosed in for example Japanese Unexamined Patent Publication (Kokai) No. 5-284458 (related U.S. Pat. No. 5,389,973) and Japanese Unexamined Patent Publication (Kokai) No. 6-319112, by using the superior "back search" method of utilizing the property that the sum of the remainders of the DCT coefficients becomes the relative minimum when using the quantization step used in the previous compression and encoding or the quantization step of a multiple of the same and searching for the quantization step giving the smallest relative minimum as the optimum quantization step, it is possible to make the quantization steps equal between the time of compression and encoding and the time of expansion and decoding and thus prevent the deterioration of the video quality.

However, in a case where the GOP is of a 2-frame structure containing one intra-picture and one B picture or a case where the GOP is of a 15-frame structure, in order to suppress the deterioration of the video quality at the time of tandem connection, rather than matching the quantization steps, it is first more important to compress and encode the same pictures to the same type of pictures (picture types) each time, that is, to match phases of GOPs in each compression and encoding.

When the GOPs are out of phase, the above back search method can no longer be used. In addition, the same pictures end up being compressed and encoded to different picture types, for example, a picture expanded and decoded from a B picture or a P picture is compressed and encoded to an intra-picture. A large amount of the video information is consequently lost with each compression and encoding and the quality of picture is greatly deteriorated.

In order to deal with such a problem, as disclosed in for example Japanese Unexamined Patent Publication (Kokai) No. 6-284414 (related to U.S. Pat. Ser. No. 08/477,855), the method may be considered of multiplexing and outputting the picture type and the decoded video data at the time of expansion and decoding and having the encoder perform the compression and encoding by matching the phases of the GOPs by referring to the multiplexed picture type.

According to the method disclosed in Japanese Unexamined Patent Publication (Kokai) No. 6-284414, however, the information of the picture type ends up being multiplexed on a part of the video data other than the valid pixels. When, for example, there are operation desks (switchers) of television broadcasting stations or digital VTRs etc. of different systems between the tandem connected encoder and decoder, there is a possibility in that the information of the picture type will be lost due to blanking or the like.

When the information of the picture type is lost or the information of the picture type is replaced by other information or random data in this way, there is a possibility that the next encoder will erroneously detect the random data etc. as the information of the picture type, encode by the wrong picture type, and conversely cause a greater deterioration of the quality of the video.

DISCLOSURE OF THE INVENTION

The present invention was made so as to solve the above problem and has as an object thereof to provide a video data compression apparatus capable of automatically detecting the picture type of the previous time of compression and encoding at the encoder side and performing the compression and encoding by matching the GOPs in phase even if information of the picture type is not particularly multiplexed on the video pixel data, and a method of the same.

The video data compression apparatus according to the present invention compresses an intra-picture detecting means for detecting a picture compressed and encoded to an intra-picture in the previous compression processing among pictures of video data obtained by expanding video data which was compressed the previous time to a combination of intra-pictures and non-intra-pictures; a picture type judging means for judging to which picture type between an intra-picture and a non-intra-picture each of the pictures of the video data was compressed to in the compression processing based on an interval of detected intra-pictures; and a video data compressing means for compressing each of the pictures of the video data to the same picture type as that in the previous compression processing.

Preferably, in the video data compression apparatus, the intra-picture detecting means compresses an orthogonal transforming means for orthogonally transforming each of the pictures of the video data for every macroblock to generate orthogonally transformed data; a dividing means for dividing the orthogonally transformed data for every macroblock of each of the pictures of the video data generated by the orthogonal transforming means by each of a plurality of quantization steps; a remainder sum calculating means for calculating the sum of the remainders of the results of division by the plurality of quantization steps generated by the dividing means of the orthogonally transformed data for every macroblock of each of the pictures of the video data: and a detecting means for detecting whether or not a picture of the video data was compressed and encoded to an intra-picture in the previous compression processing based on whether or not there is a relative minimum of the sum of the remainders.

Preferably, the intra-picture detecting means of the video data compression apparatus compresses an orthogonal transforming means for orthogonally transforming part of the macroblocks of each of pictures of the video data to generate orthogonally transformed data; a dividing means for dividing the orthogonally transformed data of part of the macroblocks of each of the pictures of the video data generated by the orthogonal transforming means by each of the plurality of quantization steps; a remainder sum calculating means for calculating the sum of the remainders of each of the results of division by the plurality of quantization steps by the dividing means of the orthogonally transformed data of part of the macroblocks of each of pictures of the video data; and a detecting means for detecting whether or not a picture of the video data was compressed and encoded to an intra-picture in the previous compression processing based on whether or not there is a relative minimum of the sum of remainders.

Preferably, the intra-picture detecting means of the video data compression apparatus compresses a quantization step selecting means for selecting the quantization step giving the smallest relative minimum of the sum of remainders; and the video data compressing means has a quantizing means for quantizing the video data by using the selected quantization step.

Preferably, the intra-picture detecting means of the video data compression apparatus detects a picture compressed and encoded to an intra-picture in the previous compression processing before the video data compressing means compresses the video data.

Further, the video data compression apparatus of the present invention compresses a compression processing discriminating means for discriminating whether or not the input video data has gone through compression processing in the past; a quantization step generating means for reproducing the quantization step in the compression processing to generate a first quantization step when it is discriminated that the input video data has gone through compression processing in the past and generating a predetermined second quantization step when it is discriminated that the input video data has not gone through compression processing; and a video data compressing means for compressing the input video data by using the generated first quantization step or second quantization step.

Preferably, the quantization step generating means of the video data compression apparatus compresses an orthogonal transforming means for orthogonally transforming each of the pictures of the video data for every macroblock to generate orthogonally transformed data; a dividing means for dividing the orthogonally transformed data for every macroblock of each of the pictures of the generated video data by each of the plurality of quantization steps; a remainder sum calculating means for calculating the sum of the remainders of each of the results of division of the orthogonally transformed data for every macroblock of each of the pictures of the video data by the plurality of quantization steps; and a determining means for determining the quantization step giving the smallest relative minimum of the sum of remainders as the first quantization step.

Preferably, the video data compression apparatus further compresses a picture type discriminating means for discriminating to which picture type of an intra-picture or non-intra-picture each of the pictures of the input video data was compressed to in the compression processing when the input video data has gone through compression processing for generating intra-pictures and non-intra-pictures; and the video data compressing means compresses each of the pictures of the input compressed video data to the same picture type as that in the compression processing when the input video data has gone through compression processing for generating the intra-pictures and non-intra-pictures after compression.

Preferably, the discriminating means of the video data compression apparatus discriminates whether or not the input video data has gone through compression processing by comparing the sum of remainders and a predetermined threshold and further has a threshold adjusting means for adjusting a threshold in accordance with which picture type of an intra-picture or non-intra-picture each of the pictures of the input video data was compressed to in the compression processing.

Preferably, the quantization step generating means of the video data compression apparatus generates a second quantization step only in a case where the order of picture types of the input video data input in the previous compression processing satisfies a predetermined condition.

BRIEF DESCRIPTION OF THE DRAWINGS

FIG. 7 is a flow chart illustrating an operation of a video index detection unit of the encoder shown in FIG. 5.

BEST MODE FOR WORKING THE INVENTION

First Embodiment

Below, a first embodiment of the present invention will be explained.

Background of the First Embodiment

For example, when dubbing video data by using a plurality of VTR apparatuses among television broadcasting stations, in order to expand and decode video data which has been already compressed and encoded by the MPEG2 method and compress and encode the same again, there sometimes arises the need for connecting the encoder and the decoder in tandem. Where the compression and encoding and the expansion and decoding of video data are repeated in this way, the quality of picture is deteriorated.

In order to minimize the deterioration of the quality of picture when repeatedly performing the compression and encoding and the expansion and decoding of video data, it is important that the quantization steps used in the compression and encoding and the expansion and decoding the same by the above back search or the like and, further, to match the phases of the GOPs whenever performing the compression and encoding.

When the GOPs are out of phase, the above back search method can no longer be used. In addition, the same pictures end up being compressed and encoded to different picture types, for example, a picture expanded and decoded from a B picture or a P picture is compressed and encoded to an intra-picture. A large amount of the video information is consequently lost each time performing the compression and encoding and therefore the quality of picture is greatly deteriorated.

The encoder 2 (2a, 2b) shown in the first embodiment was made in order to solve the above problem and is constituted so as to be able to automatically detect the picture type of the previous compression and encoding at the encoder side and compress and encode the same by matching the GOP phase even if the information of the picture type is not particularly multiplexed with the valid pixel data.

Video Data Processing System 1

Below, an explanation will be made of a video data processing system 1 in which the encoder and the decoder for video data are connected in tandem. The encoder according to the present invention is used in the video data processing system 1.

Figure 1:
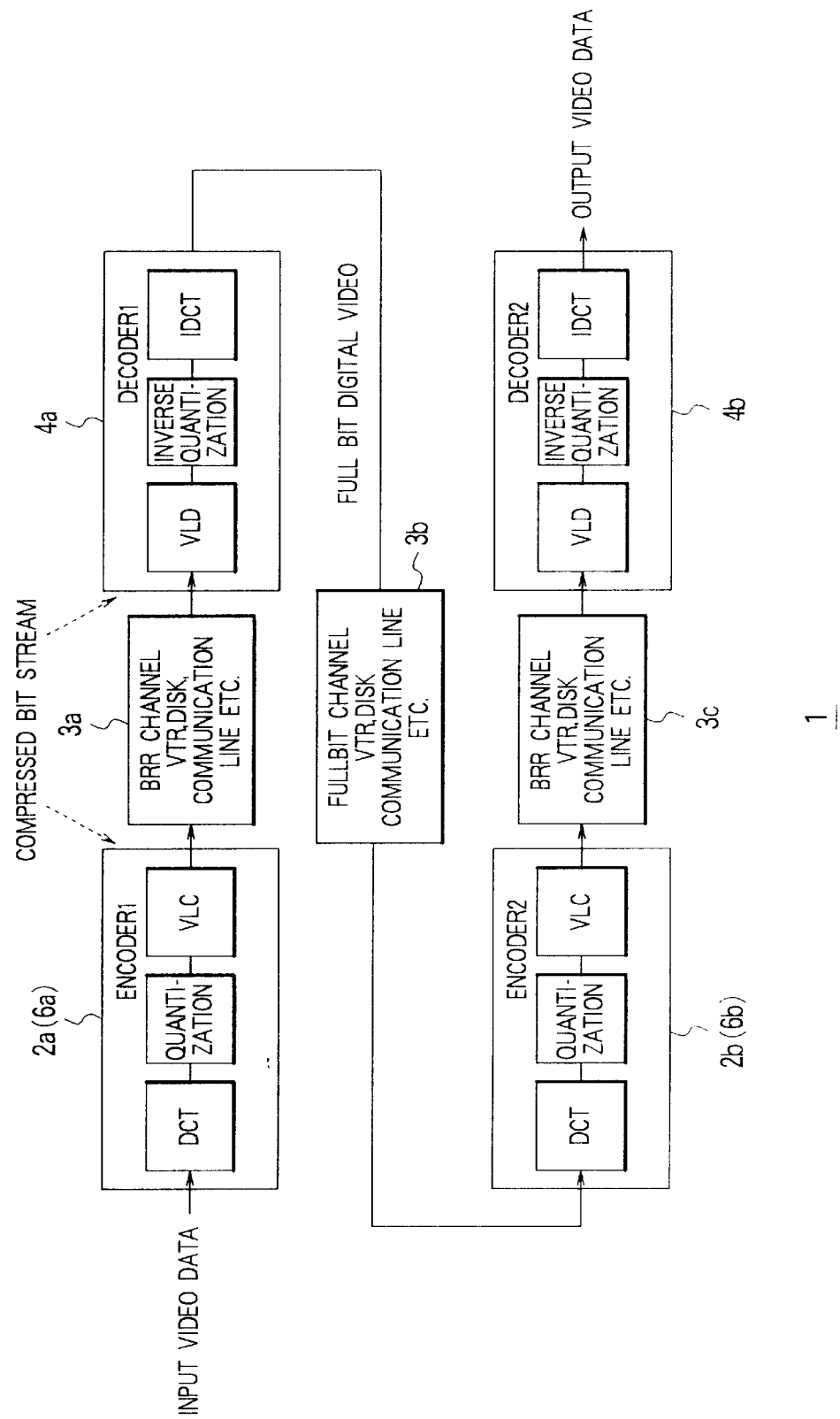
FIG. 1 is a view of the configuration of a video data processing system in which an encoder according to the present invention is used.

FIG. 1 is a view of the configuration of the video data processing system 1 in which the encoder 2 according to the present invention is used.

As shown in FIG. 1, the video data processing system 1 adopts a structure in which encoders (encoder 1, encoder 2) 2a and 2b and decoders (decoder 1, decoder 2) 4a and 4b are connected in series (tandem connected) via a VTR, hard disk drive, or other recording apparatus or communication lines or transmission lines and other recording and transmission apparatuses (brr channels) 3a to 3c.

Note that even in a case where the configuration of the video data processing system 1 is not clearly adopted and even in a case where, for example, a plurality of VTRs for compressing and encoding input non-compressed video data by the MPEG2 method or the like, recording the same on a VTR tape, and expanding and decoding the same for output at the time of reproduction are connected for dubbing the video data, the route through which the video data passes becomes substantially the same as that of the video data processing system 1. Further, the encoders 2 (2a, 2b) exhibit the characteristic effect to the present invention when non-compressed video data is compressed and encoded to GOPs including a plurality of types of pictures.

In the video data processing system 1, the encoder 2a compresses and encodes the non-compressed video data (input video data) input from an external portion into units of GOPs containing a plurality of types of pictures by an MC-DCT method such as the MPEG2 method to generate the compressed video data (compressed and encoded bit stream) and transmits the same via the recording and transmission apparatus 3 (3a) to the decoder 4a.

The decoder 4a expands and decodes the compressed video data input from the encoder 2a via the recording and transmission apparatus 3a to return this to for example the non-compressed (full bit) video data for example for a D-1 digital VTR designed for editing etc. and transmits the same via the recording and transmission apparatus 3 (3b) to the encoder 2b.

The encoder 2b compresses and encodes the full bit video data input from the decoder 4a via the recording and transmission apparatus 3b by the same method as that of the encoder 2a and transmits the same via the recording and transmission apparatus 3 (3c) to the decoder 4b.

The decoder 4b expands and decodes the compressed video data input from the encoder 2b via the recording and transmission apparatus 3c in the same way as the decoder 4a and outputs the same as the output video data.

Note that, in the video data processing system 1, three or more stages of tandem-connected encoders 2, recording and transmission apparatuses 3, and decoders 4 are sometimes contained in accordance with need. The components of the third and subsequent stages perform the compression and encoding, transmission, and expansion and decoding of the video data in the same way as those of the second stage and previous stage.

Further, in FIG. 1, as the recording and transmission apparatus 3b labeled as the full bit channel, other than an apparatus for simply transmitting or recording and reproducing the expanded and decoded full bit video data, for example, an apparatus for converting the expanded and decoded video data from the digital to analog (D/A) format and recording the same in an analog VTR apparatus, an apparatus for converting this again from the analog to digital (A/D) format to return the same to digital video data, or an apparatus for editing and processing the video data via a switcher or special effect apparatus are also included. In such apparatuses as well, there is a possibility of loss of the information of the picture type recorded together with the video data.

Encoder 2 (2a, 2b)

Figure 2:
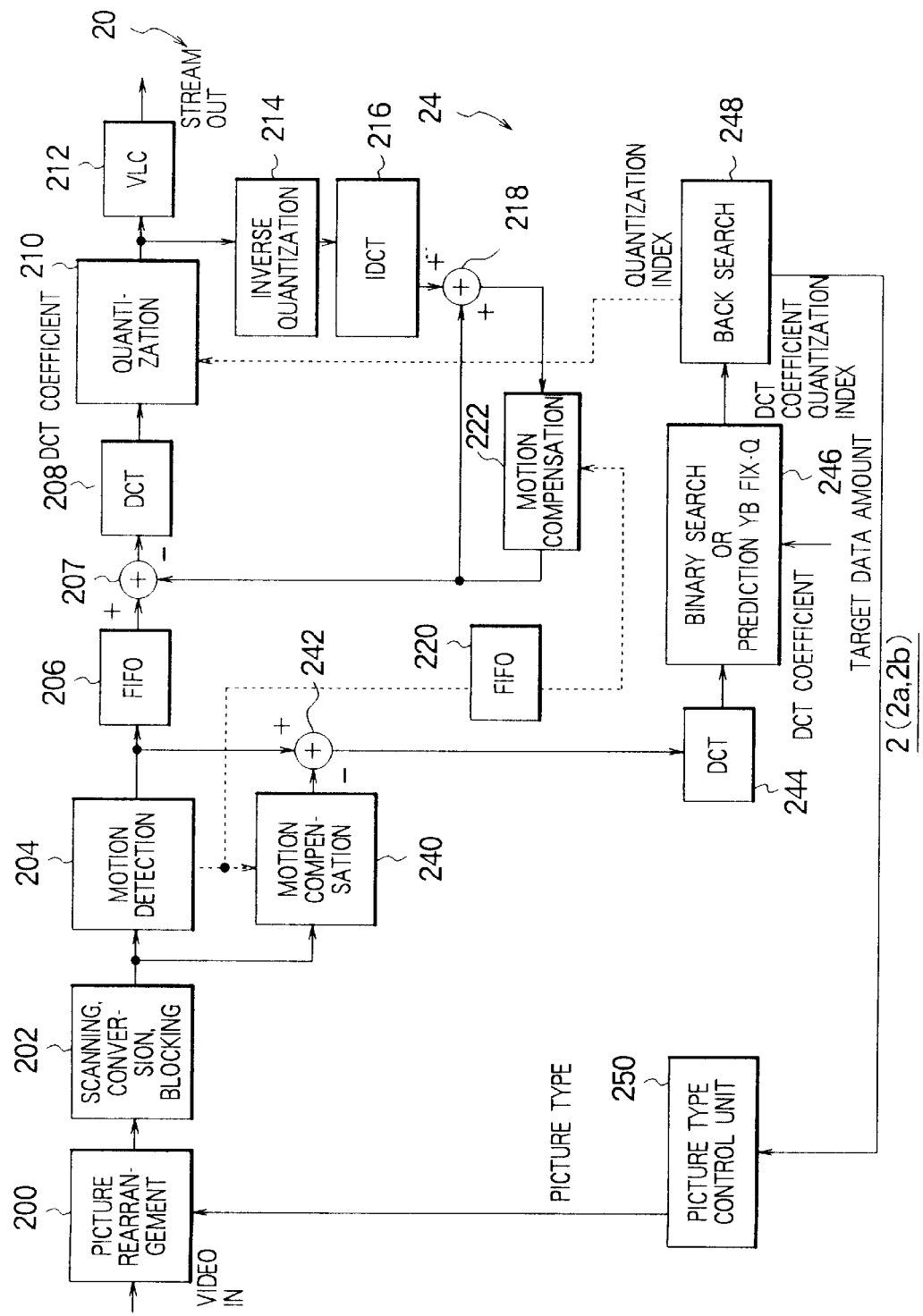
FIG. 2 is a view of the configuration of an encoder according to the present invention in a first embodiment shown in FIG. 1.

FIG. 2 is a view of the configuration of the encoder 2 (2a, 2b) according to the present invention in the first embodiment shown in FIG. 1.

As shown in FIG. 2, the encoder 2 is constituted by a compression and encoding unit 20 and a compression control unit 24.

The compression and encoding unit 20 is constituted by a picture rearrangement unit 200, a scanning, conversion, and blocking unit 202, a motion detection unit 204, FIFOs 206 and 220, a subtraction circuit 207, a DCT unit 208, a quantization unit 210, a variable length coding unit (VLC) 212, an inverse quantization unit 214, an inverse DCT (intra DCT) unit 216, an addition circuit 218, and a motion compensation unit 222.

The compression control unit 24 is constituted by a motion compensation unit 240, a subtraction circuit 242, a DCT unit 244, a prediction unit 246, a back search unit 248, and a picture type control unit 250.

The encoder 2, using these components, detects the GOP phase in the previous compression and encoding from the input video data (video in) which already has gone through the compression and encoding and the expansion and decoding by the MPEG2 method or the like at least one time and, at the same time, reproduces the quantization step in the previous compression and encoding by the back search method, compresses and encodes the input video data again by the quantization step and GOP phase the same as those of the previous time, and thereby prevents the deterioration of the quality of picture when tandem connecting an encoder and decoder and repeatedly performing the compression and encoding and the expansion and decoding of the video data.

Components of the Encoder 2

Below, an explanation will be given of each component of the encoder 2.

Compression and Encoding Unit 20

The compression and encoding unit 20 performs the motion compensation processing, DCT processing, and variable length coding processing with respect to the input video data to compress and encode the same in the same way as a general encoder of the MPEG2 system.

In the compression and encoding unit 20, under the control of the picture type control unit 250, the picture rearrangement unit 200 rearranges the pictures of the input video data to an order suited to the compression and encoding in accordance with which picture type the picture of the input video data will become after the compression and encoding and outputs the result to the scanning, conversion, and blocking unit 202.

The scanning, conversion, and blocking unit 202 converts the video data input from the picture rearrangement unit 200 from a field to frame format, divides it into macroblocks, and outputs the result to the motion detection unit 204 and the motion compensation unit 240 of the compression control unit 24.

The motion detection unit 204 outputs the video data input from the scanning, conversion, and blocking unit 202 to the FIFO 206 and the subtraction circuit 242 of the compression control unit 24 and, at the same time, processes the video data input from the scanning, conversion, and blocking unit 202 in units of macroblocks to detect the motion thereof, generates a motion vector indicating the motion of the video, and outputs the same to the motion compensation unit 240 and FIFO 220.

The FIFO 206 buffers the video data input from the motion detection unit 204 to give a delay of exactly a time required for processing (predictive encoding processing) in the DCT unit 244, the prediction unit 246, and the back search unit 248 of the compression control unit 24 and outputs the result to the subtraction circuit 207.

The subtraction circuit 207 outputs the video data of pictures which become intra-pictures after the compression and encoding among pictures contained in the video data input from the FIFO 206 as it is to the DCT unit 208.

Further, the subtraction circuit 207 subtracts the output video data of the motion compensation unit 222 from the video data of the pictures which become P pictures or B pictures after the compression and encoding among pictures contained in the video data input from the FIFO 206 to generate predictive error data and outputs the same to the DCT unit 208.

The DCT unit 208 performs the DCT processing on the video data which will become intra-pictures after the compression and encoding input from the subtraction circuit 207 and the predictive error data of the video data which will become P pictures or B pictures after the compression and encoding and outputs the DCT coefficients obtained as the result of the DCT processing to the quantization unit 210.

The quantization unit 210 quantizes the DCT coefficients input from the DCT unit 208 by the quantization steps indicated by the quantization index input from the back search unit 248 of the compression control unit 24 and outputs the same as the quantized data to the variable length coding unit 212 and the inverse quantization unit 214.

The variable length coding unit 212 performs variable length coding on the quantized data input from the quantization unit 210 by for example the run length encoding method and outputs the same as the output video data (stream out).

The inverse quantization unit 214 performs the reverse processing to that of the quantization unit 210 with respect to the input quantized data to reproduce the DCT coefficients and outputs the same to the inverse DCT unit 216.

The inverse DCT unit 216 performs the reverse processing to that of the DCT unit 208 with respect to the input DCT coefficients to reproduce the video data and outputs the same to the addition circuit 218.

The addition circuit 218 adds the video data input from the inverse DCT unit 216 and the video data input from the motion compensation unit 222 to reproduce the video data and outputs the same to the motion compensation unit 222.

The FIFO 220 buffers the motion vector input from the motion detection unit 204 to delay the same by exactly a time required for the processing of the FIFO 206 to the addition circuit 218 and outputs the same to the motion compensation unit 222.

The motion compensation unit 222 performs motion compensation processing with respect to the video data input from the addition circuit 218 using the motion vector input from the FIFO 220 and outputs the result to the subtraction circuit 207 and the DCT unit 208.

Compression Control Unit 24

The compression control unit 24 detects the quantization step and GOP phase in the previous compression and encoding of the input video data and controls the compression and encoding unit 20 so that they coincide. Further, the compression control unit 24 calculates the quantization step giving a total amount (data rate) of the output video data output from the variable length coding unit 212 of not more than the permissible value of the output video data for each time (unit period) of generation of one to several GOPs worth of compressed video data (for example, transmission capacity of the transmission line) and almost equal to this permissible value based on the complexity of the pattern of the input video data and the speed of motion (difficulty of pattern (difficulty)) and sets the same in the quantization unit 210 in the form of a quantization index.

In the compression control unit 24, the motion compensation unit 240 performs motion compensation processing with respect to the video data input from the scanning, conversion, and blocking unit 202 by using the motion vector input from the motion detection unit 204 in the same way as the motion compensation unit 222 of the compression and encoding unit 20 and outputs the result to the subtraction circuit 242.

The subtraction circuit 242 subtracts the motion compensated video data input from the motion compensation unit 240 from the video data input from the motion detection unit 204 in the same way as the subtraction circuit 207 of the compression and encoding unit 20 so as to generate the video data of intra-pictures and the predictive error data of the P pictures or the B pictures and outputs the same to the DCT unit 244.

The DCT unit 244 performs DCT on the video data of the intra-pictures input from the subtraction circuit 242 and the predictive error data of the P pictures or B pictures in the same way as the DCT unit 208 of the compression and encoding unit 20 so as to generate the DCT coefficients obtained as the result of the DCT processing and outputs the same to the prediction unit 246.

The prediction unit 246 outputs the DCT coefficients input from the DCT unit 244 to the back search unit 248.

Further, the prediction unit 246 quantizes the DCT coefficients input from the DCT unit 244 by the quantization step (fix-q) of a fixed value for every unit period using as unit periods the time for generation of for example one to several GOPs worth of the compressed video data to generate the quantized data.

Further, the prediction unit 246 estimates the difficulty of pattern of the input video data for every unit period based on a target data amount set from an external portion by the user or the like of the video data processing system 1 (encoder 2) and indicating the permissible value and a data amount (generated code amount) of the generated quantized data.

Further, the prediction unit 246 allocates a larger data amount (date rate) to a portion of the input video data with a difficult pattern in accordance with the estimated difficulty of pattern of the input video data and allocates a smaller data amount (data rate) to the portion of the input video data with a simple pattern so as to hold the quality of the output video data high as a whole and, in addition, calculates a quantization index indicating the quantization step which should be actually used for every unit period so that the total amount of the output video data does not exceed the above permissible value and outputs the same to the back search unit 248.

Note that, in the prediction unit 246, it is also possible to adopt for example a method of quantizing the DCT coefficients input from the DCT unit 244 to generate the quantized data by using some temporary quantization value, comparing the data amount (generated code amount) of the generated quantized data and the target data amount (permissible value), and predicting the optimum quantization step by a binary tree search according to which is larger [binary search] in addition to the method of quantizing the DCT coefficients by the above quantization step of a fixed value to predict the quantization index.

Summary of Processing of Back Search Unit 248

The back search unit 248 detects the intra-picture in the previous compression and encoding based on the quantization index input from the prediction unit 246 and the DCT coefficients input from the DCT unit 244 via the prediction unit 246 and outputs the result of detection to the picture type control unit 250.

Further, the back search unit 248 decides whether or not the input video data has gone through one or more times of compression and encoding by a back search, generates a quantization index indicating the quantization step used in the previous compression and encoding, and sets the same in the quantization unit 210 of the compression and encoding unit 20.

That is, the back search unit 248 divides the DCT coefficients input from the DCT unit 244 via the prediction unit 246 by the quantization step indicated by the quantization index predicted by the prediction unit 246 and the value near this and, when there is a quantization step giving a sum of remainders of the result of division of a considerably small value, judges the quantization step indicating this considerably small value as the quantization step used in the previous compression and encoding and outputs the quantization index indicating this quantization step to the quantization unit 210.

Details of Processing of Back Search Unit 248

Details of the processing for detection of an intra-picture of the input video data by the back search unit 248 will be explained next.

The processing for detection of the GOP phase in the back search unit 248 is carried out by taking note of the property that the sum of remainders of the DCT coefficients found by the back search is a conspicuous relative minimum only when a picture expanded and decoded from an intra-picture contained in the input video data (also simply referred to as an "intra-picture of input video data") is compressed and encoded (intra coded) again to an intra-picture in the next compression and encoding as well.

The reason for this is that the value of the video data obtained as the result of the expansion and decoding cannot become a whole multiple of the quantization step even if a P picture or B picture is expanded and decoded by performing inverse DCT processing, inverse quantization, and motion compensation since the P picture or the B picture is compressed and encoded by DCT processing and quantization for the predictive error data calculated by the motion compensation processing.

Accordingly, when a picture obtained by expanding and decoding a P picture or a B picture (also simply referred to as a "P picture or B picture of the input video data") is intra-coded and subjected to back search processing, there is no relative minimum point in the sum of remainders of the DCT coefficients and therefore this cannot be found.

Further, similarly, even if a B picture (P picture) of the input video data is compressed and encoded again to the same B picture (P picture) and subjected to the back search processing, the motion vector found by the previous compression and encoding and the motion vector found from the video distorted by the next compression and encoding do not become identical. Further, the predictive error data obtained in the next compression and encoding does not become identical to the predictive error data obtained at the previous compression and encoding due to the distortion of the video by the previous compression and encoding and expansion and decoding. Accordingly, even if a B picture or P picture of the input video data is compressed and encoded to the same picture type as that of the previous time, in the back search processing, the probability of finding the relative minimum point where the sum of remainders of the DCT coefficients becomes very small is very low.

When utilizing this property in the back search processing for every picture type explained above, it is possible to automatically detect whether or not a picture of the input video data was intra-coded the previous time based on whether or not a remarkable relative minimum of the DCT coefficients is produced in the back search processing.

The back search unit 248 can decide whether or not the encoder 2 intra-coded an intra-picture of the input video data by deciding whether or not there is a conspicuous relative minimum in the sum of remainders of the DCT coefficients, for example, whether or not the ratio of the sum of remainders of the DCT coefficients found by the back search processing in the back search unit 248 with respect to the sum of remainders where the DCT coefficients are divided by the quantization step indicated by the quantization index input from the prediction unit 246 becomes less than a certain constant threshold.

In this way, the back search unit 248 can judge the interval of intra-pictures of the input video data (number N of pictures contained in GOP) by detecting the position of the intra-picture of the input video data and notifies the result of judgement to the picture type control unit 250.

The picture type control unit 250 can judge the interval of P pictures in a GOP (M) based on the interval of the intra-pictures found and the structure of the GOP (in what order which picture type is contained in the GOPs, that is, the GOP sequence) used by the encoders 2a and 2b and the decoders 4a and 4b of the video data processing system 1 and further can judge to which picture type each picture of the input video data was compressed and encoded to the previous time.

The picture type control unit 250 controls the picture rearrangement unit 200 so that each picture of the input video data is compressed and encoded to the same picture type as that of the previous time and GOP phases in the previous compression and encoding and the next compression and encoding are held based on the information indicating to which picture type the input video data judged as explained above was compressed and encoded to in the previous compression and encoding.

Operation of the Encoder 2

Below, an explanation will be made of the operation of the encoder 2 (FIG. 1, FIG. 2) shown in FIG. 1 and FIG. 2 by further referring to FIG. 3.

The motion compensation unit 240 of the compression control unit 24 performs motion compensation on the video data processed by the picture rearrangement unit 200 and the scanning, conversion, and blocking unit 202 of the compression and encoding unit 20.

The subtraction circuit 242 generates video data of the intra-pictures and the predictive error data of the P pictures or B pictures.

The DCT unit 244 performs DCT on the video data of intra-pictures and the predictive error data of the P pictures or B pictures to generate the DCT coefficients.

The prediction unit 246 quantizes the DCT coefficients input from the DCT unit 244 by the quantization step (fix-q) of a fixed value for every unit period using as unit periods the time for generation of for example one GOP's worth of the compressed video data to generate quantized data, estimates the difficulty of the input video data based on the generated code amount, and further calculates the quantization index for every unit period.

The back search unit 248 detects a picture intra-coded in the previous compression and encoding based on the quantization index generated by the prediction unit 246 and the DCT coefficients generated by the DCT unit 244 and further generates a quantization index indicating the quantization step used in the previous compression and encoding by a back search.

Figure 3:
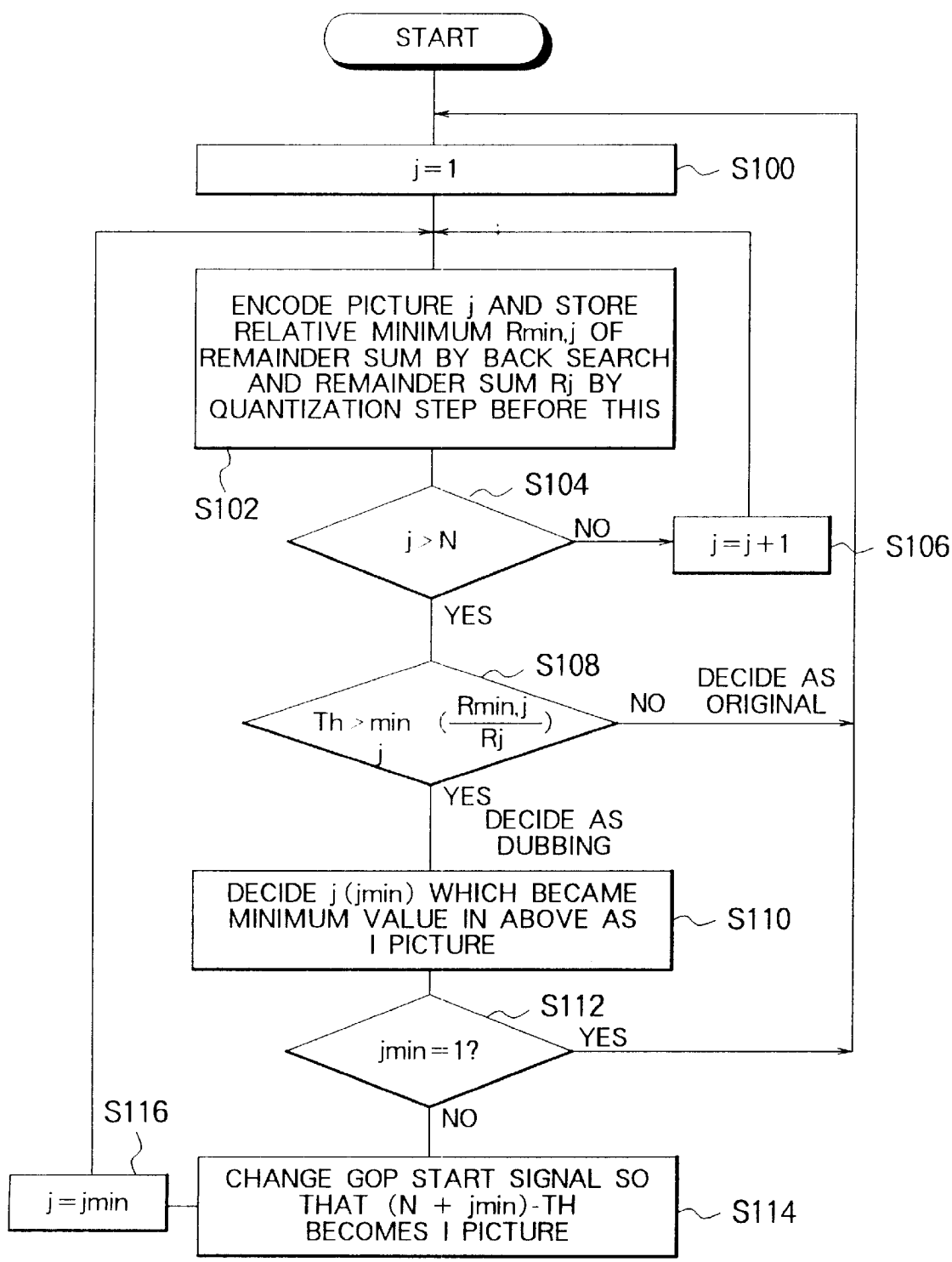
FIG. 3 is a flow chart illustrating the content of processing of a back search unit and a picture type control unit of the encoder shown in FIG. 1 and FIG. 2.

FIG. 3 is a flow chart illustrating the content of processing of the back search unit 248 and the picture type control unit 250 of the encoder 2 (2a, 2b) shown in FIG. 1 and FIG. 2, that is, how the picture of the input video data to be intra-coded is designated.

As shown in FIG. 3, at step 100 (S100), the back search unit 248 defines a variable j as an initial value 1.

At step 102 (S102), the back search unit 248 performs the back search processing on the DCT coefficients obtained as the result of compression processing of the j-th picture of the input video data by the motion compensation unit 240, the subtraction circuit 242, and the DCT unit 244 of the compression and encoding unit 20 and stores a sum $R_{min.j}$ of remainders of the DCT coefficients and a sum $R_j$ of remainders of the DCT coefficients by the quantization step obtained by the prediction unit 246 (quantization step before this).

At step 104 (S104), the back search unit 248 compares the variable j and the number N of pictures of the GOP found heretofore, proceeds to the processing of S108 when the variable j is larger than the number N of pictures, and proceeds to the processing of S106 when the variable j is equal to the number N of pictures or less.

At step 106 (S106), the back search unit 248 adds 1 to the variable j (increments it).

In a loop processing comprised by the processing of S100 to S106, the back search unit 248 performs processing for storing the sum of remainders $R_{sub.j}$ of the DCT coefficients obtained by the back search processing and the sum of remainders $R_j$ which the prediction unit 246 obtained by quantizing the DCT coefficients by a quantization step of a fixed value or by quantizing the same by a quantization step obtained by a binary search for N number of (one GOP's worth of) pictures.

At step 108 (S108), the back search unit 248 compares the minimum value [min $(R_{min.j}/R_j)$] of the ratio $(R_{min.j}/R_j)$ of N number of sums of remainders $R_{sub.j}$ obtained by the loop processing comprised of the processing of S100 to S106 with respect to the sum of remainders R obtained by the quantization step obtained by the prediction unit 246 and the predetermined threshold Th.

The back search unit 248 decides that the input video data is an original video which has not gone through the compression and encoding even one time and proceeds to the processing of S100 when the minimum value (min $(R_{min.j}/R_j)$) is equal to the threshold Th or more and decides that the input video data is video data which has already gone through compression and encoding (after dubbing) and proceeds to the processing of S110 when the minimum value (min $(R_{min.j}/R_j)$) is less than the threshold Th.

At step 110 (S110), the back search unit 248 decides the $j_{min}$-th picture giving the minimum value (min $(R_{min.j}/R_j)$) in the processing of S108 as the intra-picture of the input video data and notifies this to the picture type control unit 250.

At step 112 (S112), the picture type control unit 250 decides whether or not the $j_{min}$-th picture is the first picture of the GOP, proceeds to the processing of S100 when the $j_{min}$-th picture is the first picture of the GOP, and proceeds to the processing of S114 when the $j_{min}$-th picture is not the first picture of the GOP.

In the processing of S112, the fact that the $j_{min}$th picture is the first picture of the GOP means that the phase (structure) of the GOP covered by the current back search processing is the same as the phase (structure) of GOP covered by the previous back search processing, therefore the picture type control unit 250 does not have to change the phase of the GOP.

In contrast, in the processing of S112, the fact that the $j_{min}$-th picture is not the first picture of the GOP means that the phase (structure) of the GOP covered by current back search processing of the back search unit 248 is different from the phase (structure) of the GOP was covered by the previous processing of the back search unit 248, therefore the picture type control unit 250 has to change the phase of the GOP.

At step 114 (S114), the picture type control unit 250 controls the picture rearrangement unit 200 so as to change the order of rearrangement of the pictures so as to intra-code the picture of the N+$j_{min}$-th input video data.

At step 116 (S116), the picture type control unit 250 enters the numeral $j_{min}$ for the variable j and proceeds to the processing of S102.

The picture rearrangement unit 200 of the compression and encoding unit 20 rearranges the order of pictures of the input video data under the control of the picture type control unit 250 explained above.

The scanning, conversion, and blocking unit 202 converts the video data from a field to frame format and further forms it into macroblocks.

The motion detection unit 204 processes the video data in units of macroblocks, detects the motion thereof, and generates a motion vector indicating the motion of the video.

The FIFO 206 buffers the video data to give it a predetermined time delay.

The subtraction circuit 207 generates the predictive error data of pictures which becomes a P picture or B picture after the compression and encoding.

The DCT unit 208 performs the DCT processing on the video data which becomes an intra-picture after the compression and encoding and the predictive error data of the video data which becomes a P picture or B picture to generate the DCT coefficients.

The quantization unit 210 quantizes the DCT coefficients input from the DCT unit 208 by the quantization step indicated by the quantization index generated by the back search unit 248 of the compression control unit 24, and generates the quantized data.

The variable length coding unit 212 performs variable length coding on the quantized data input from the quantization unit 210 and outputs the result as the output video data (stream out).

The inverse quantization unit 214 performs inverse quantization processing on the quantized data to reproduce the DCT coefficients.

The inverse DCT unit 216 performs inverse DCT processing on the reproduced DCT coefficients to reproduce the video data.

The addition circuit 218 adds the video data input from the inverse DCT unit 216 and the video data input from the motion compensation unit 222.

The FIFO 220 buffers the motion vector input from the motion detection unit 204 to give a predetermined time delay.

The motion compensation unit 222 performs the motion compensation processing on the video data input from the addition circuit 218 using the motion vector input from the FIFO 220.

Modification

Below, an explanation will be made of a modification of the first embodiment by referring to FIG. 4.

The encoder 2 (FIG. 1, FIG. 2) is constituted so as to detect the picture type at the previous compression and encoding when performing the back search processing for finding the quantization index to be set in the quantization unit 210 of the compression and encoding unit 20 and control the processing for rearrangement of pictures of the picture rearrangement unit 200, therefore the amount of delay is large. Further, it is not possible to quickly change the order of rearrangement of pictures in the picture rearrangement unit 200.

However, to find the relative minimum point of the sum of remainders of the DCT coefficients by the back search processing, it is not always necessary to calculate the sum of remainders for all DCT coefficients of the pictures. It is sufficient to extract some macroblocks in the picture and checked whether or not there is a relative minimum point in the sum of remainders.

The next explained modification (encoder 5) of the encoder 2 shown in the first embodiment takes note of this point and is for increasing the processing speed of the encoder 2. It is constituted to separate the function of generating the quantization index and the function of detecting the phase of the GOP and compresses and encodes the input video data after detecting the GOP phase in advance.

Figure 4:
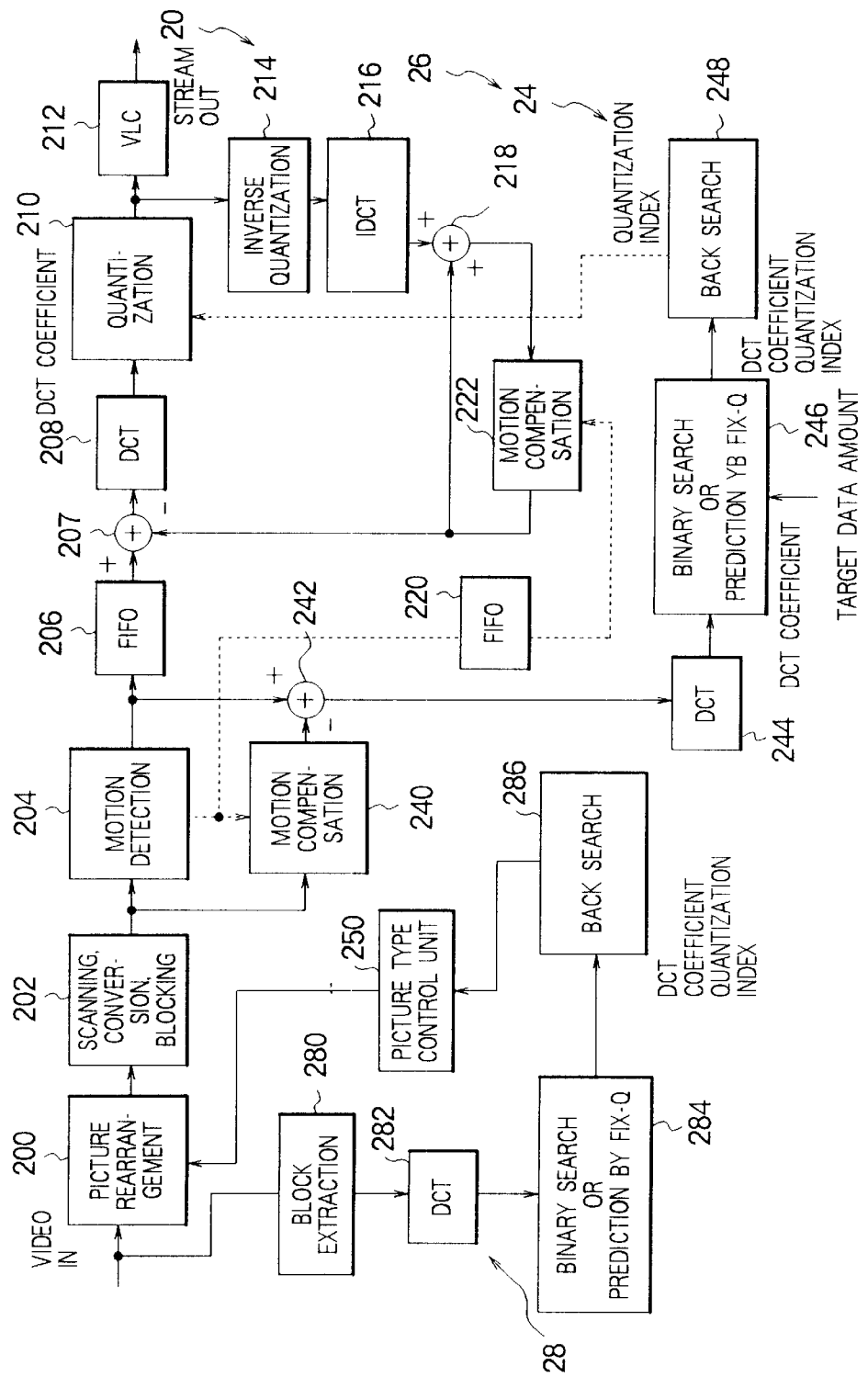
FIG. 4 is a view of the configuration of the encoder of a modification of the first embodiment.

FIG. 4 is a view of the configuration of the encoder 5 of the modification of the first embodiment. Note that, in FIG. 4, the same references are given to the same elements as those of the encoder 2 among the constituent parts of the encoder 5.

As shown in FIG. 4, the encoder 5 is constituted by the compression and encoding unit 20 and the compression control unit 26.

The compression control unit 26 is structured as the compression control unit 24 (FIG. 2) plus the GOP phase control unit 28.

The GOP phase control unit 28 is constituted by a block extraction unit 280, a DCT unit 282, a prediction unit 284, and a back search unit 286.

In the GOP phase control unit 28 of the compression control unit 26, the block extraction unit 280 extracts several blocks worth of the video data from each picture of the input video data and outputs the same to the DCT unit 282.

The DCT unit 282 performs the DCT processing on the several blocks worth of the video data from the block extraction unit 280 and outputs the DCT coefficients obtained by the DCT processing to the prediction unit 284.

The prediction unit 284 estimates the difficulty of the pattern of the input video data by a quantization step (fix-q) of a fixed value or a binary search for every unit period in the same way as the prediction unit 246 of the compression control unit 24, calculates the quantization index indicating the quantization step which should be actually used for every unit period, and outputs the same to the back search unit 286.

The back search unit 286 performs back search processing by using the quantization index input from the prediction unit 284 and the DCT coefficients input from the DCT unit 282 via the prediction unit 284 in the same way as the back search unit 248 of the compression control unit 24 in the encoder 2, detects the GOP phase (intra-picture) of the input video data, and notifies this to the picture type control unit 250.

The picture type control unit 250 controls the processing of the picture rearrangement unit 200 of the compression and encoding unit 20 according to the information indicating the position of the intra-picture input from the back search unit 286 in the same way as that in the encoder 2.

Note that, unlike the encoder 2, in the encoder 5, there is no motion compensation preceding the detection of the GOP phase (detection of intra-picture), therefore the back search unit 286 of the GOP phase control unit 28 performs the back search processing on the DCT coefficients obtained by intra-coding for all pictures of the input video data. Accordingly, as a result, the decision by the GOP phase control unit 28 of whether or not the input video data has already gone through compression and encoding becomes very easy.

Further, it does not matter if each component of the encoder 2 (2a, 2b) shown in FIG. 1 and FIG. 2 is constituted by software or by hardware so far as it can realize an identical function and performance.

Further, each component of the encoder 2 can be replaced by another device capable of realizing an identical function and performance.

Further, the encoder 2 can be applied to the compression and encoding of other types of data having redundancy other than video data, for example, audio data, by making suitable modifications.

Effect

As explained above, according to the encoders 2 and 5, the next compression and encoding can be carried out while keeping the GOP phase the same as that of the previous compression and encoding and therefore deterioration of the quality of picture in the video data processing system 1 shown in FIG. 1 can be prevented.

Further, with the encoders 2 and 5, there is none of the problem of erroneous operation etc. which had occurred in the conventional method, that is, multiplexing the compressed video data and the information indicating the picture type and performing the next compression and encoding based on that picture type information, when the picture type information is lost or when original video data which has not gone through compression and encoding even one time is input.

Further, with the encoders 2 and 5, for example, even when the compressed video data is returned to an analog video signal and later is recorded etc. again as digital compressed video data, the compression and encoding can be carried out with a GOP phase the same as that of the compressed video data before returning to the analog video data and therefore the deterioration of the quality of picture can be prevented.

Further, since the encoder 5 detects the GOP phase by using just part of the macroblocks of the pictures, the size of the hardware is not greatly increased compared with the encoder 2.

Further, according to the encoder 5, the processing time required for detecting the GOP phase is shortened, so the delay time can be shortened compared with the encoder 2.

Second Embodiment

Below, a second embodiment of the present invention will be explained.

In the back search processing of the back search unit 248 of the encoders 2 and 5, the method was adopted of detecting the quantization step used in the previous compression and encoding based on whether or not there is a relative minimum, of a remarkable ratio exceeding a predetermined threshold, in the sum of remainders of the DCT coefficients, therefore if this threshold is set too small, there is a possibility that a relative minimum of sum of remainders of the DCT coefficients will be erroneously detected from some of the macroblocks of the pictures of original video data in which there is inherently no relative minimum of sum of remainders of the DCT coefficients and which has not gone through compression and encoding even one time.

When the back search unit 248 erroneously detects a sum of remainders of DCT coefficients and the quantization unit 210 of the compression and encoding unit 20 performs quantization based on the erroneously generated quantization step (quantization index), there is a possibility that the DCT coefficients will be quantized by a value larger than the optimum quantization step and that, as a result, the quality of picture will considerably deteriorate.

Further, conversely, when the threshold used for the detection of the sum of remainders of the DCT coefficients is set too large, even if video data which has already gone through compression and encoding is input, there is a possibility that the relative minimum of the sum of remainders of the DCT coefficients will not be able to be detected in some macroblocks in the pictures. When the relative minimum which originally should be detected cannot be detected, the quantization processing in the next compression and encoding will be carried out by a quantization step different from that in the previous compression and encoding and the quality of picture will considerably deteriorate.

From these viewpoints, it is necessary to suitably select the threshold used for the detection of the sum of remainders of the DCT coefficients. Solving this problem, however, is difficult. Further, there is also a possibility that the above problem will conspicuously appears according to some patterns of input video data.

On the other hand, in an encoder and decoder of the MC-DCT method using GOPs having a multi-frame structure, it is impossible to reproduce the motion vector the same as that of the previous time in the picture type to be subjected to the motion compensation processing at the time of the compression and encoding, therefore the reproducibility of the motion vector and predictive error in the next compression and encoding is low and, as a result, there is no conspicuous relative minimum in the sum of remainders of the DCT coefficients of pictures compressed and encoded to B pictures and P pictures in the previous compression and encoding.

Accordingly, even if the back search unit 248 performs the back search processing using a threshold for detecting a picture intra-coded in the previous compression and encoding, it cannot detect the relative minimum of the DCT coefficients from pictures compressed and encoded to B pictures and P pictures in the previous compression and encoding.

An object of the second embodiment is to solve this problem, realize back search processing capable of preventing erroneous detection of the picture type, and prevent deterioration of the quality of picture when for example a plurality of digital VTRs are connected to dub video data.

Figure 5:
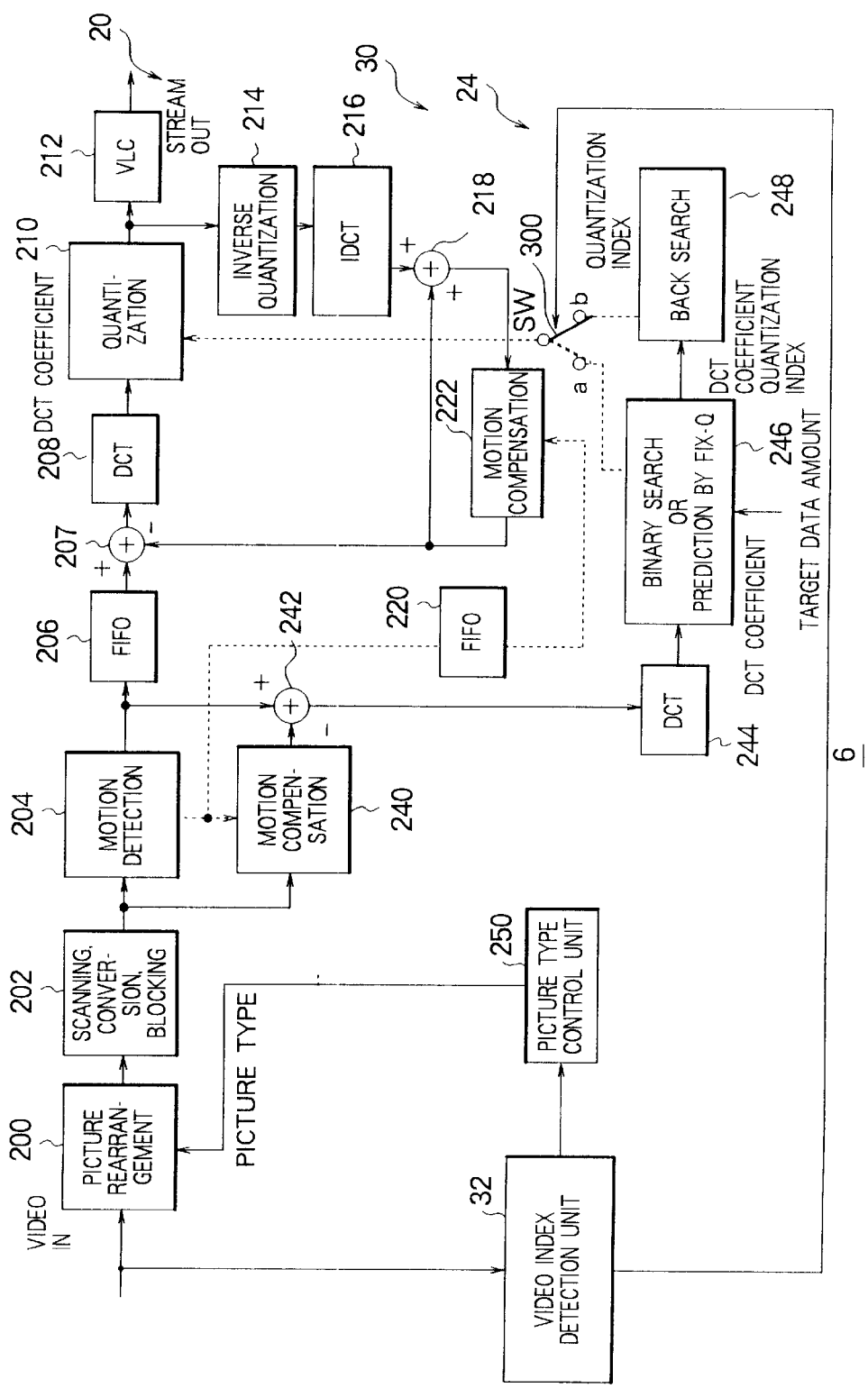
FIG. 5 is a view of the configuration of the encoder according to the present invention in a second embodiment.

FIG. 5 is a view of the configuration of the encoder 6 according to the present invention in the second embodiment. Note that, in FIG. 5, among the components of the encoder 6, the same components as those of the encoder 2 shown in FIG. 2 and the encoder 5 shown in FIG. 4 are given the same reference numerals.

As shown in FIG. 5, the encoder 6 is constituted by the compression and encoding unit 20, the compression control unit 30, and a video index (provisional name) detection unit 32. The compression control unit 30 is structured as the compression control unit 24 of the encoders 2 and 5 (FIG. 1, FIG. 2, and FIG. 4) plus a switch (sw) circuit 300. Note that the encoder 6 shown in the second embodiment is constituted so as to perform motion compensation in the compression and encoding, but motion compensation processing is not indispensable.

The encoder 6 is used in place of the encoders 2 and 5 in for example the video data processing system 1 (FIG. 1), detects to which picture type each picture contained in the input video data was compressed and encoded to the previous time in the same way as the encoders 2 and 5, and, further, quantizes the DCT coefficients by the same quantization step as that of the previous time to perform the compression and encoding.

Back Search Processing in the Encoder 6

The back search processing in the encoder 6 is changed taking note of the property that it is better not to use the back search algorithm for the original video which has not gone through compression and encoding even one time and that is it is preferable to apply it to only video data which has already gone through compression and encoding by an encoder using the same compression and encoding method.

That is, in the encoders 2 and 5 shown in the first embodiment, the back search processing is carried out for all pictures of the input video data and it is expected that valid back search processing will occur where there is no relative minimum found in the sum of remainders of the DCT coefficients in the original video data and there is a relative minimum found in the sum of remainders only in video data which has already gone through compression and encoding, but there are cases where things do not go as expected.

Therefore, the encoder 6 shown in the second embodiment is constituted so as to use a video index to discriminate whether the picture of the input video data is video data which has already gone through compression and encoding or is original video data, not perform the back search processing if it is discriminated as original video data and video data which was compressed and encoded by another method the previous time, and conversely execute the back search processing only when the input video data was compressed and encoded by the same method the previous time and the GOP phase of previous time is the same as the GOP phase in the next compression and encoding.

Method of Detection of Previous Compression and Encoding Method

Next, an explanation will be made of a method of detecting whether or not the previous compression and encoding method was the same as the next compression and encoding method.

At present, in the SMPTE, the standard is becoming to multiplex information indicating the encoding conditions, referred to as the video index, with the video data at the decoder side. By detecting whether or not a correct video index is multiplexed on the video data, it is possible to judge at the input part of the encoder 6 whether or not the input video data was compressed and encoded by the same method the previous time and whether or not the phase (structure) of the GOP in the next compression and encoding and the phase of the GOP in the previous compression and encoding coincide. Below, an explanation will be made of a case where the decoders 4a and 4b multiplex the video index on the video data in the video data processing system 1.

Summary of Operation of Video Index Detection Unit 32

Below, a brief explanation will be made of the operation of a video index detection unit 32.

The video index detection unit 32 monitors whether or not the correct video index information is multiplexed on the input video data and controls the operation of the picture rearrangement unit 200 via the picture type control unit 250 so that the phase (structure) of the GOP in the next compression and encoding and the phase of the GOP in the previous compression and encoding coincide only in the case when the correct video index information is multiplexed on the input video data and the phase (structure) of the GOP in the next compression and encoding and the phase of the GOP in the previous compression and encoding coincide and further controls the switch circuit 300 to make this select an input terminal b and output the quantization step (quantization index) determined by the processing of the back search unit 248 of the compression control unit 24 to the quantization unit 210.

Further, conversely, when it is better not to perform the compression and encoding with the GOP phase of the previous compression and encoding, such as when there is no video index multiplexed on the input video data at all, when it is multiplexed, but a different compression and encoding method is indicated, or the same compression and encoding method is indicated, but the GOP phase is changed by editing or the like, the video index detection unit 32 controls the switch circuit 300 to make it select an input terminal a and output the quantization step (index) found by a fixed quantization step or binary search by the prediction unit 246 to the quantization unit 210.

Details of Operation of Video Index Detection Unit 32

Below, a detailed explanation will be made of the operation of the video index detection unit 32 by referring to FIG. 7.

FIG. 7 is a flow chart illustrating the operation of the video index detection unit 32 of the encoder 6 shown in FIG. 5. This illustrates the operation from when the video index detection unit 32 fetches the video data of one picture to when the quantization index is generated.

As shown in FIG. 7, at step 200 (S200), the video index detection unit 32 of the encoder 6 fetches one picture's worth of the next input video data.

At step 202 (S202), the video index detection unit 32 decides whether or not the next input video data could be fetched and terminates the processing when the input video data could not be fetched.

At step 204 (S204), the video index detection unit 32 demultiplexes and reads out all of the data of the position at which the video index of the input video data should have been multiplexed (for example 3 bytes).

At step 206 (S206), the video index detection unit 32 performs a CRC check with respect to the 3 bytes of the read data. Where the result of the CRC check is that the 3 bytes of data are correct, the routine proceeds to the processing of S208, while where they are not correct, the routine proceeds to the processing of S216.

At step 208 (S208), the video index detection unit 32 decides whether or not thee conditions in the next (present) compression and encoding and the conditions in the previous compression and encoding coincide based on the data not changed for every picture indicating the GOP structure contained in the video index, the interval (M) of the P pictures, and the quantization method (Q_type). When they coincide, the routine proceeds to the processing of S210, while when they do not coincide, the routine proceeds to the processing of S216.

At step 210 (S210), the video index detection unit 32 compares the picture type and frame number (N) contained in the index and the picture type and frame number (N) expected in the next (present) compression and encoding and decides whether or not they coincide. When they coincide, the routine proceeds to the processing of S212, while when they do not coincide, the routine proceeds to the processing of S216.

That is, the video index detection unit 32 checks whether or not the data indicating the picture type and the data indicating the frame number contained in the video index coincide with those of the expected pattern. For example, when the GOP has a 2-frame structure of one B picture and one intra-picture, it is expected that the first picture of the GOP will be the B picture and the second will be the intra-picture.

Accordingly, the video index detection unit 32 decides that the video index is correct only in two cases, that is, the case where the data (Frame No.) indicating the frame number contained in the video index data is "1" and the data indicating the picture type contained in the video index data is the "B picture" and the case where the data (Frame No.) indicating the frame number contained in the video index data is "2" and the data indicating the picture type contained in the video index data is the "intra-picture".

At step 212 (S212), the video index detection unit 32 decides whether or not the information indicating the GOP phase contained in the index coincides with the GOP phase in the next (present) compression and encoding. Where they coincide, the routine proceeds to the processing of S214, while where they do not coincide, the routine proceeds to the processing of S216.

That is, the video index detection unit 32 makes the quantization index generated by the back search unit 248 valid only in the case where the GOP phase in the next (present) compression and encoding and the data indicating the GOP phase contained in the video index coincide.

At step 214 (S214), the video index detection unit 32 controls the switch circuit 300 to make it select the input terminal b side and output the quantization index generated by the back search unit 248 to the quantization unit 210 of the compression and encoding unit 20.

That is, the video index detection unit 32 makes the back search processing in the back search unit 248 valid only in the case where all conditions indicated in the processings of S202 and S206 to S212 are satisfied, controls the switch circuit 300 in the processing of S214 to make it output the quantization index generated by the back search unit 248 to the quantization unit 210.

At step 216 (S216), the video index detection unit 32 makes the switch circuit 300 select the input terminal a side so that the quantization unit 210 is controlled to perform the quantization using not the quantization index generated by the back search unit 248, but the quantization index generated by the prediction unit 246 (free run processing).

That is, the video index detection unit 32 makes the back search processing in the back search unit 248 invalid where any of the conditions indicated in the processings of S202 and S206 to S212 is not satisfied and controls the switch circuit 300 at S216 to make it output the quantization index generated by the prediction unit 246 to the quantization unit 210.

Decoder 4 (4a, 4b)

Figure 6:
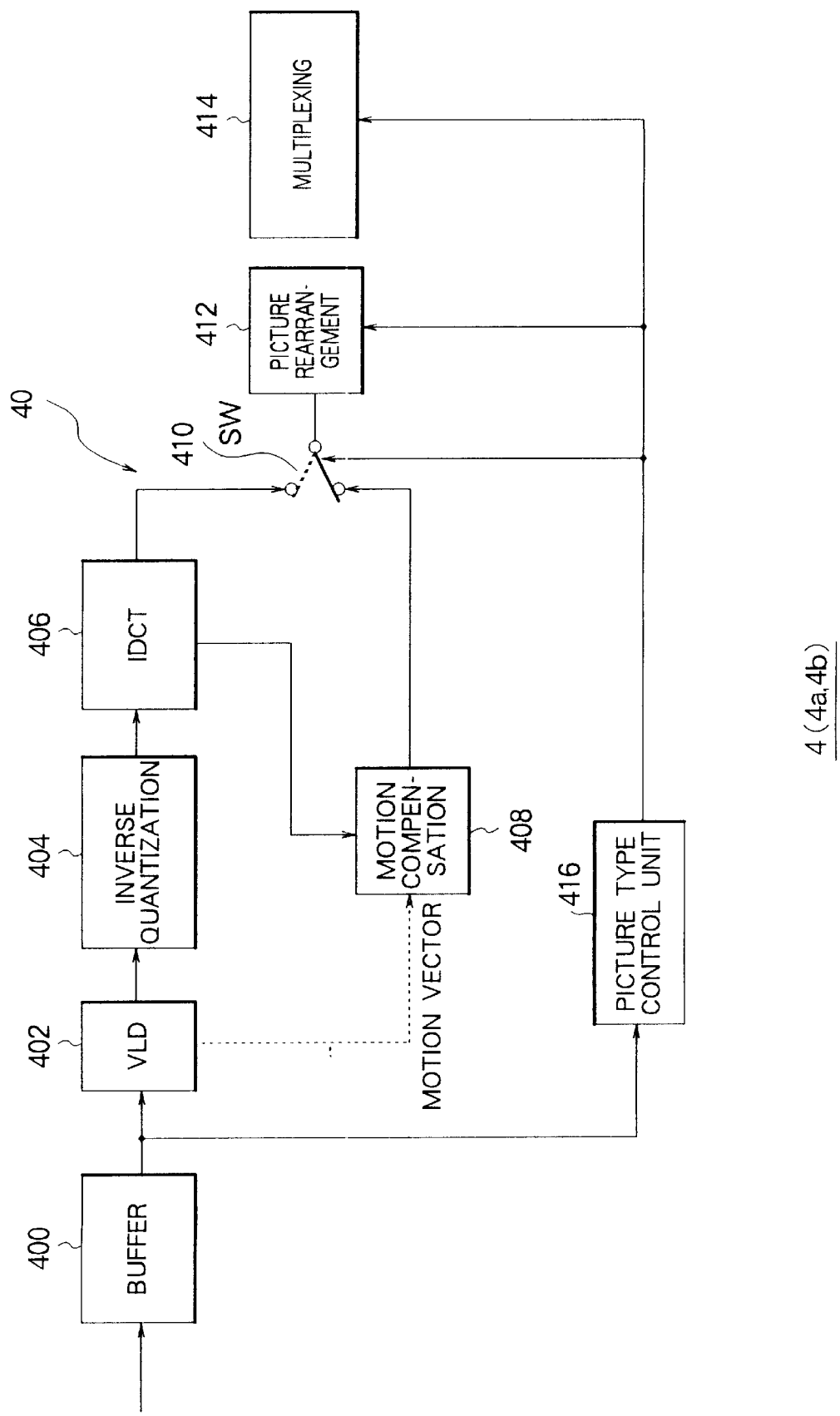
FIG. 6 is a view of the configuration of a decoder shown in FIG. 1.

FIG. 6 is a view of the configuration of the decoder 4 (4a, 4b) shown in FIG. 1.

In the video data processing system 1 (FIG. 1), when the encoder 6 is used in place of the encoders 2 and 5, the decoders 4a and 4b are structured as an expansion and decoding unit 40 as shown in FIG. 6 plus a video index multiplexing unit 414.

The expansion and decoding unit 40 is constituted by, in the same way as the general video data use decoder device, a buffer memory (buffer) 400, a variable length decoding unit (VLD) 402, an inverse quantization unit 404, an inverse DCT unit 406, a motion compensation unit 408, a switch circuit 410, a picture rearrangement unit 412, and a picture type control unit 416.

The expansion and decoding unit 40 expands and decodes the compressed video data input from the encoder 2 to generate the full bit video data and outputs the same to the video index multiplexing unit 414.

The video index multiplexing unit 414 generates a video index indicating the previous compression and encoding method and the GOP structure etc. based on the GOP sequence of the compressed video data detected by the picture type control unit 416, adds the video index to the video data input from the picture rearrangement unit 412, and outputs the same to the encoder 2.

Operation of Video Data Processing System 1 in Second Embodiment

Below, an explanation will be made of the operation of the video data processing system 1 (FIG. 1) using the encoder 6 (FIG. 5) and the decoder 4 (FIG. 6).

The encoder 6 (6a) compresses and encodes the input video data and transmits the same to the decoder 4 (4a) via the recording and transmission apparatus 3a.

The decoder 4a expands and decodes the compressed video data input from the encoder 6a to generate the full bit video data, multiplexes the video index data, and transmits the same via the recording and transmission apparatus 3b to the encoder 6 (6b).

In the encoder 6b, the video index detection unit 32 (FIG. 5) performs the processing shown in FIG. 7 whenever one picture's worth of the video data of worth is input, decides whether or not the video index multiplexed on the input video data is correct, controls the switch circuit 300 to set either of the quantization step (quantization index) generated by the back search unit 248 or the quantization step (quantization index) generated by the prediction unit 246 in the quantization unit 210 of the compression and encoding unit 20, and controls the picture rearrangement unit 200 of the compression and encoding unit 20 via the picture type control unit 250 to make it rearrange the pictures of the input video data to the order suited to the compression and encoding in the encoder 6b.

The picture rearrangement unit 200 of the compression and encoding unit 20 and subsequent components and the compression control unit 30 compress and encode the input video data in the same way as the encoders 2 and 5 and transmits the same via the recording and transmission apparatus 3c to the decoder 4b.

Note that, as in the encoder 6, when the picture rearrangement unit 200 of the compression and encoding unit 20 is controlled based on the video index, the picture type at the previous compression and encoding can be determined even at the next compression and encoding, therefore it is possible to optimize the threshold used in the back search processing of the back search unit 248 of the compression control unit 30 in the next and subsequent compressions and encodings in accordance with the picture type based on the picture type at the previous compression and encoding.

That is, where the picture intra-coded at the previous compression and encoding is also intra-coded the next time, a conspicuous relative minimum of the sum of remainders of the DCT coefficients easily appears in the back search processing (FIG. 3). Accordingly, by setting the threshold used in the back search processing relatively large, erroneous detection of the relative minimum of the sum of remainders of the DCT coefficients can be prevented.

Conversely, as mentioned above, when the pictures compressed and encoded to the B pictures and P pictures in the previous compression and encoding are compressed and encoded to the same picture type in the next compression and encoding as well, since this is compression and encoding using motion prediction, the motion vector found in the previous compression and encoding and the motion vector found from the next and subsequent distorted video data will not coincide. Even if the sum of remainders of the DCT coefficients obtained by DCT processing the predictive error of the non-intra-pictures is sought, not that conspicuous a relative minimum will appear.

For this reason, when compressing and encoding pictures compressed and encoded to the B pictures and P pictures in the previous compression and encoding to the same picture type in the next compression and encoding as well, if the threshold to be used in the back search processing of the back search unit 248 is set relatively high, there is a possibility that the back search unit 248 will not be able to find the correct quantization step (quantization index).

Accordingly, when compressing and encoding pictures compressed and encoded to B pictures and P pictures in the previous compression and encoding to the same picture type in the next compression and encoding as well, it is possible to make the back search unit 248 find the correct quantization step (quantization index) by making the threshold used in the back search processing of the back search unit 248 a small value compared with the case of performing the intra-coding.

Modification

Note that, in the encoder 6 shown in FIG. 5, the video index detection unit 32 controls the switch circuit 300 to change the quantization step (quantization index), but it is also possible to change the operation of the video index detection unit 32 so as to directly turn the back search unit 248 on or off and change the operation of the back search unit 248 so as to output the quantization step (quantization index) input from the prediction unit 246 to the quantization unit 210 where the operation is turned OFF by the video index detection unit 32 and output the quantization step (quantization index) generated by the back search unit 248 itself to the quantization unit 210 when the operation is turned ON.

Further, similar modifications as those made to the encoders 2 and 5 (FIG. 1, FIG. 2, and FIG. 4) are possible for the encoder 6.

Effect

As explained above, according to the encoder 6 shown in the second embodiment, the video index detection unit 32 of the compression and encoding unit 30 makes the back search processing of the back search unit 248 invalid when the original video data is input, therefore it is possible to prevent erroneous operation of compressing and encoding the original video data using a large quantization step and therefore possible to improve the quality of picture of the compressed video data obtained by compressing and encoding the original video data.

Further, in the encoder 6, the video index detection unit 32 of the compression and encoding unit 30 makes the back search processing of the back search unit 24 invalid when the original video data is input, therefore the value of the threshold used by the back search unit 248 when video data which has already gone through compression and encoding is input can be optimized to small, the detection error of the relative minimum of the sum of remainders of the DCT coefficients can be prevented, and thus the precision of the back search processing is improved. Accordingly, as a result, according to the encoder 6, the quality of the compressed video data obtained by compressing and encoding the video data which has already gone through compression and encoding is improved.

As explained above, by the data compression apparatus according to the present invention and the method of same, even if information of the picture type is not particularly multiplexed on the valid pixel data, the picture type at the previous compression and encoding is automatically detected at the encoder side so the data can be compressed and encoded by matching the GOP phases.

What is claimed is:

1. A video data compression apparatus comprising:
    an intra-picture detecting means for detecting a picture compressed and encoded to an intra-picture in the previous compression processing among pictures of video data obtained by expanding video data which was compressed the previous time to a combination of intra-pictures and non-intra-pictures;
    a picture type judging means for judging to which picture type between an intra-picture and a non-intra-picture each of the pictures of the video data was compressed to in the compression processing based on an interval of detected intra-pictures; and
    a video data compressing means for compressing each of the pictures of the video data to the same picture type as that in the previous compression processing.

2. A video data compression apparatus as set forth in claim 1, wherein the intra-picture detecting means comprises:
    an orthogonal transforming means for orthogonally transforming each of the pictures of the video data for every macroblock to generate orthogonally transformed data;
    a dividing means for dividing the orthogonally transformed data for every macroblock of each of the pictures of the video data generated by the orthogonal transforming means by each of a plurality of quantization steps;
    a remainder sum calculating means for calculating the sum of the remainders of the results of division by the plurality of quantization steps generated by the dividing means of the orthogonally transformed data for every macroblock of each of the pictures of the video data; and
    a detecting means for detecting whether or not a picture of the video data was compressed and encoded to an intra-picture in the previous compression processing based on whether or not there is a relative minimum of the sum of the remainders.

3. A video data compression apparatus as set forth in claim 1, wherein the intra-picture detecting means comprises:
    an orthogonal transforming means for orthogonally transforming part of the macroblocks of each of pictures of the video data to generate orthogonally transformed data;
    a dividing means for dividing the orthogonally transformed data of part of the macroblocks of each of the pictures of the video data generated by the orthogonal transforming means by each of the plurality of quantization steps;
    a remainder sum calculating means for calculating the sum of the remainders of each of the results of division by the plurality of quantization steps by the dividing means of the orthogonally transformed data of part of the macroblocks of each of pictures of the video data; and
    a detecting means for detecting whether or not a picture of the video data was compressed and encoded to an intra-picture in the previous compression processing based on whether or not there is a relative minimum of the sum of remainders.

4. A video data compression apparatus as set forth in claim 2, wherein the intra-picture detecting means comprises a quantization step selecting means for selecting the quantization step giving the smallest relative minimum of the sum of remainders and the video data compressing means comprises a quantizing means for quantizing the video data by using the selected quantization step.

5. A video data compression apparatus as set forth in claim 2, wherein the intra-picture detecting means detects a picture compressed and encoded to an intra-picture in the previous compression processing before the video data compressing means compresses the video data.

6. A video data compression method comprising the steps of:

detecting a picture compressed and encoded to an intra-picture in the previous compression processing among pictures of video data obtained by expanding video data which was compressed the previous time to a combination of intra-pictures and non-intra-pictures;

judging to which picture type between an intra-picture and a non-intra-picture each of the pictures of the video data was compressed to in the compression processing based on an interval of detected intra-pictures; and compressing each of the pictures of the video data to the same picture type as that in the previous compression processing.

7. A video data compression method as set forth in claim 6, further comprising the steps of:

orthogonally transforming each of the pictures of the video data for every macroblock to generate orthogonally transformed data;

dividing the orthogonally transformed data for every macroblock of each of the pictures of the video data generated by each of a plurality of quantization steps;

calculating the sum of the remainders of the results of division by the plurality of quantization steps generated of the orthogonally transformed data for every macroblock of each of the pictures of the video data; and detecting whether or not a picture of the video data was compressed and encoded to an intra-picture in the previous compression processing based on whether or not there is a relative minimum of the sum of the remainders.

8. A video data compression method as set forth in claim 6, further comprising the steps of:

orthogonally transforming part of the macroblocks of each of pictures of the video data to generate orthogonally transformed data;

dividing the orthogonally transformed data of part of the macroblocks of each of the pictures of the video data generated by each of the plurality of quantization steps;

calculating the sum of the remainders of each of the results of division by the plurality of quantization steps of the orthogonally transformed data of part of the macroblocks of each of pictures of the video data; and detecting whether or not a picture of the video data was compressed and encoded to an intra-picture in the previous compression processing based on whether or not there is a relative minimum of the sum of remainders.

9. A video data compression method as set forth in claim 7, further comprising the steps of:

selecting the quantization step giving the smallest relative minimum of the sum of remainders and quantizing the video data by using the selected quantization step.

10. A video data compression method as set forth in claim 7, further comprising the step of detecting a picture compressed and encoded to an intra-picture in the previous compression processing before compressing the video data.

11. A video data compression apparatus comprising:

a compression processing discriminating means for discriminating whether or not the input video data has gone through compression processing in the past;

a quantization step generating means for reproducing the quantization step in the compression processing to generate a first quantization step when it is discriminated that the input video data has gone through compression processing in the past and generating a predetermined second quantization step when it is discriminated that the input video data has not gone through compression processing; and a video data compressing means for compressing the input video data by using the generated first quantization step or second quantization step.

12. A video data compression apparatus as set forth in claim 11, wherein the quantization step generating means comprises:

an orthogonal transforming means for orthogonally transforming each of the pictures of the video data for every macroblock to generate orthogonally transformed data;

a dividing means for dividing the orthogonally transformed data for every macroblock of each of the pictures of the generated video data by each of the plurality of quantization steps;

a remainder sum calculating means for calculating the sum of the remainders of each of the results of division of the orthogonally transformed data for every macroblock of each of the pictures of the video data by the plurality of quantization steps; and a determining means for determining the quantization step giving the smallest relative minimum of the sum of remainders as the first quantization step.

13. A video data compression apparatus as set forth in claim 11, further comprising:

a picture type discriminating means for discriminating to which picture type of an intra-picture or non-intra-picture each of the pictures of the input video data was compressed to in the compression processing when the input video data has gone through compression processing for generating intra-pictures and non-intra-pictures and the video data compressing means compresses each of the pictures of the input compressed video data to the same picture type as that in the compression processing when the input video data has gone through compression processing for generating the intra-pictures and non-intra-pictures after compression.

14. A video data compression apparatus as set forth in claim 13, wherein the discriminating means discriminates whether or not the input video data has gone through compression processing by comparing the sum of remainders and a predetermined threshold and further has a threshold adjusting means for adjusting a threshold in accordance with which picture type of an intra-picture or non-intra-picture each of the pictures of the input video data was compressed to in the compression processing.

15. A video data compression apparatus as set forth in claim 13, wherein the quantization step generating means generates a second quantization step only in a case where the order of picture types of the input video data input in the previous compression processing satisfies a predetermined condition.

16. A video data compression method comprising the steps of:

discriminating whether or not the input video data has gone through compression processing in the past;

reproducing the quantization step in the compression processing to generate a first quantization step when it is discriminated that the input video data has gone through compression processing in the past;

generating a predetermined second quantization step when it is discriminated that the input video data has not gone through compression processing; and compressing the input video data by using the generated first quantization step or second quantization step.

17. A video data compression method as set forth in claim 16, further comprising the steps of:

orthogonally transforming each of the pictures of the video data for every macroblock to generate orthogonally transformed data;

dividing the orthogonally transformed data for every macroblock of each of the pictures of the generated video data by each of the plurality of quantization steps;

calculating the sum of the remainders of each of the results of division of the orthogonally transformed data for every macroblock of each of the pictures of the video data by the plurality of quantization steps; and determining the quantization step giving the smallest relative minimum of the sum of remainders as the first quantization step.

18. A video data compression method as set forth in claim 16, further comprising the steps of:

discriminating to which picture type of an intra-picture or non-intra-picture each of the pictures of the input video data was compressed to in the compression processing when the input video data has gone through compression processing for generating intra-pictures and non-intra-pictures and compressing each of the pictures of the input compressed video data to the same picture type as that in the compression processing when the input video data has gone through compression processing for generating the intra-pictures and non-intra-pictures after compression.

19. A video data compression method as set forth in claim 18, further comprising the steps of:

discriminating whether or not the input video data has gone through compression processing by comparing the sum of remainders and a predetermined threshold and adjusting a threshold in accordance with which picture type of an intra-picture or non-intra-picture each of the pictures of the input video data was compressed to in the compression processing.

20. A video data compression method as set forth in claim 18, further comprising the step of generating a second quantization step only in a case where the order of picture types of the input video data input in the previous compression processing satisfies a predetermined condition.

* * * * *